INVENTOR.
David C. Rockola
BY Horton, Davis, Brewer & Brugman
Att'ys

INVENTOR.
David C. Rockola
BY Horton, Davis, Brewer & Brugman
Att'ys

United States Patent Office 3,085,228

Patented Apr. 9, 1963

3,085,228

SELECTIVELY OPERABLE CONTROL MECHANISM FOR AUTOMATIC PHONOGRAPHS

David C. Rockola, Chicago, Ill., assignor to Rock-Ola Manufacturing Corporation, Chicago, Ill., a corporation of Delaware Original application Nov. 16, 1953, Ser. No. 392,265, now Patent No. 2,909,761, dated Oct. 20, 1959. Divided and this application July 24, 1959, Ser. No. 829,288
4 Claims. (Cl. 340—147)

This invention relates in general to automatic coin-controlled phonographs, and more particularly to selectively operable control mechanism therefor, and is a division of my co-pending application Serial No. 392,265, filed November 16, 1953, issued October 20, 1959, as United States Patent No. 2,909,761. In the latter is disclosed novel mechanism which will enable an operator to effect any one of a large number of possible operations, such as the playing of any one of a large number of available phonograph recordings, after the proper coin or coins have been deposited, by operating a single push button from a group of buttons in number substantially less than that of the total possible operations.

This mechanism includes a plurality of groups of indices of available selections in superposed and edge-pivoted or book-like form with each group comprising a page or two opposed pages of indices of a number of selections, so that an operator may leaf through such pages in a natural fashion similar to leafing through a bound book. The same number of selector push buttons or manually operable control members as there are indices in each group are disposed in marginally adjacent alignment with the individual indices of such groups or pages, with control means automatically operable by the means supporting the pages for such leafing action to effect group selections or selection of that group of indices thereby exposed to view, whereby operation of any push button will effect on operation of the mechanism thereby controlled corresponding to or identified by the exposed index marginally aligned therewith. Thus each actuation of each push button may effect any one of a plurality of different operations equal in number to the number of such groups provided, but the particular operation effected will be that identified by the exposed index marginally aligned therewith. Thus each actuation of each push button may effect any one of a plurality of different operations equal in number to the number of such groups provided, but the particular operation effected will be that identified by the exposed index associated with the operated button.

More specifically, in the embodiment of the invention therein disclosed are parallel rows of manually operable selector buttons, with ten buttons in each row, disposed at opposite sides of two adjacent stationary pages of ten identifying indices each, whereby each index has one of those selector buttons marginally associated and visually aligned therewith; and an edge of each of two leaf members is pivotally mounted adjacent the intersection or dividing line between the stationary pages so that those leaves may be swung into superposed relation with either of the stationary pages. Each leaf mounts ten indices on each side arranged similarly to those on the stationary pages, resulting in four movable pages of ten indices each, so that three different groups of two pages and twenty indices each may be selectively exposed to view and each push button may have three different indices visually aligned with it. Control means in the form of switches are actuated by the movable leaves to automatically effect group selection and eliminate any possibility of error on the part of the operator in that respect, as could readily occur if all indices were exposed to view at all times and the operator were required to make a group selection by manually actuating one of a plurality of group control members. Such automatic group selection control means thus insures actuation only of the proper one of the possible three different controlled operations which can result in response to depression of each selector button. In other words, actuation of selector button #1 will result (1) in operation of selection #1 in the first group identified by index #1, on page one if the first group comprising pages one and two is exposed to view; (2) in operation of selection #21 identified by index #21, which is correspondingly positioned relative to selector button #1 on page three, if the second group comprising pages three and four is exposed to view; or (3) in operation of selection #41 if the third group comprising pages five and six is exposed to view, since index #41 then is superposed over indices #21 and #1.

Another aspect of the invention therein disclosed is the provision of a relatively simple and inexpensive transmitter for automatically transmitting individually identifiable selection signals to the controlled mechanism in response to actuation of such selectively operable control members by use of a coding or pulsing system employing only a three wire transmitting conductor and including a wiper arm cyclically operable in response to depression of any one of the selector buttons to successively wipe over two series of contacts which are controlled, respectively, by the several selector buttons and the leaf-actuated control switches to transmit two spaced pulse trains over a single signal line. The first such train in each instance comprises a particular number of pulses corresponding to the particular selector button which is depressed, the circuit being controlled in response to depression of each selector button to energize a corresponding number of the spaced contacts of the first series. A greater spacing is provided between the two series of contacts successively engaged by the wiper arm than that separating the contacts of each series to differentiate between the two signal trains. The second train in each instance comprises no signal if the first group of pages one and two of the indices is exposed, one signal pulse if pages three and four comprising the second group of identifying indices is exposed, and two pulses if the third group of indices is exposed to the view of the operator so that the actuated selector button is visually associated with an index on pages five or six. This second signal train is controlled automatically by the previously mentioned switches actuated by the movable program or index supporting leaves.

A principal object of the instant invention is to provide novel means for receiving a multi-train signal and interpreting the same to effect operation of a particular one of a plurality of electrically controllable devices. In the illustrated embodiment, this is attained by a first switch means having a plurality of blades and a plurality of contacts engageable by each of said blades, means for electrically interconnecting each of the contacts with one of the electrically controllable devices, level step switch means for selectively rendering the blades effective, and pulse-responsive means for effecting positioning of the blades in response to a first train of the multi-train signal and actuation of the level step switch means in response to a second train of the multi-train signal.

Numerous other objects and advantages of the invention will be apparent as it is better understood from the following description, which, when taken in connection with the accompanying drawings, discloses a preferred embodiment thereof.

Figure 1:
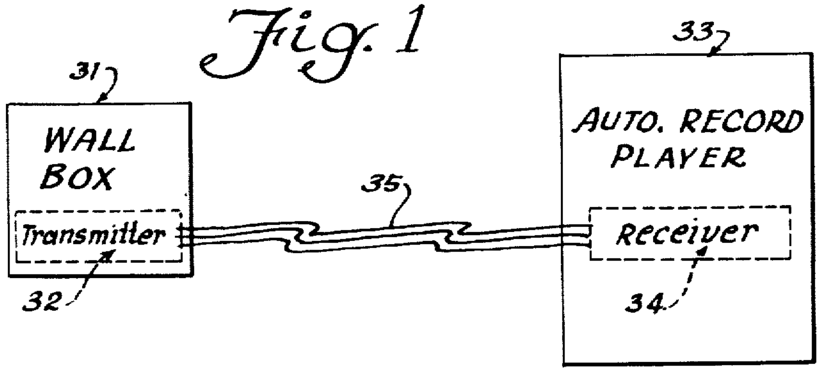
FIGURE 1 is a diagrammatic illustration of a system including the receiver of my invention.

Referring more particularly to FIG. 1 of the drawings, the instant invention is illustrated diagrammatically as embodied in an automatic phonograph having a remote control unit, such as a wall box 31, including a transmitter or signal effecting means, designated generally by reference numeral 32, and a device for selective operation under the control thereof, such as a record player 33, including a receiver or signal interpreting means, designated generally by reference numeral 34, interconnected electrically with the transmitter 32 by a simple three wire conductor 35. The remote control unit 31, as more specifically disclosed in the above-identified parent case, includes two parallel rows of selectively operable push buttons or manual control members or keys 42, shown as numbering ten in each row, which are marginally associated and visually aligned each with one of a group of visible indices. As hereinbefore noted, pages of such indices are therein provided that may be selectively positionable to expose or render visible different groups of the indices. As illustrated in the wiring diagram of FIG. 2 for the control or transmitter unit 31, each push button 42 when depressed actuates a double switch 43, 44 of well-known construction. The control unit 31 also includes the usual coin-receiving slot and a "make selection" light 46.

Figure 2:
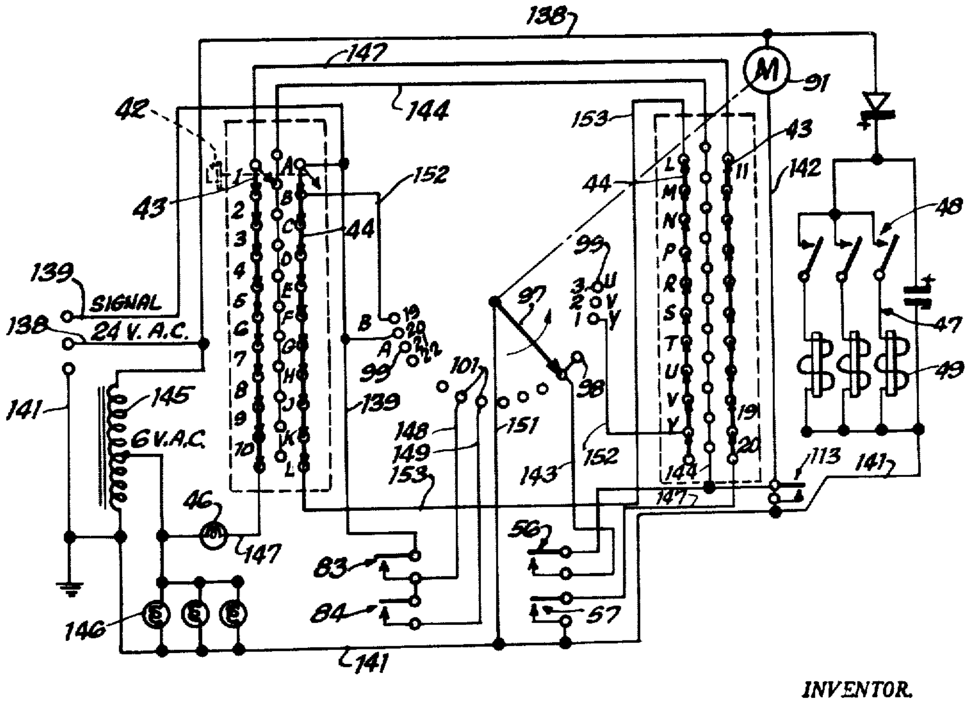
FIG. 2 is a wiring diagram of a signal transmitting unit capable of selectively effecting multi-train signals.

Deposit of one or more coins in the coin-receiving slot causes positive or additive actuation of an accumulator, indicated generally by reference numeral 47 in FIG. 2, in the manner fully described in U.S. Letters Patent No. 2,613,791, issued October 14, 1952. Briefly, coins of different denominations close different switches 48 (FIG. 2) to energize the proper coil 49 to effect proper additive operation of an accumulator for registering the total units of value of the coin or coin deposited. A stud forming a part of the accumulator normally holds a pair of accumulator switches 56, 57 open, and the latter are both closed as that stud moves out of contact therewith in response to such additive actuation of the accumulator, and remain closed so long as any positive value remains in the accumulator.

Control means are provided which are automatically operable by the movable pages to effect group selections or automatic selection of that group of controlled mechanisms identified by the visually exposed group of indices. This control means comprises a plurality of group signal switches, being two in number in the illustrated embodiment of the invention, designated by reference numerals 83 and 84. These switches 83, 84 are normally closed leaf switches that are held closed by their respective pages when the latter are disposed at one side of the control unit 31 and are adapted to be opened and held open whenever their associated pages are swung to their opposite side positions.

The control unit 31 includes a motor 91 connected to drive a shaft carrying a contact wiper arm 97 for successively engaging, first a pair of contacts 98, and then two series of contacts 99 and 101, in each cycle of operations comprising one complete rotation of the shaft. A normally open full cycle switch 113 is closed upon coin deposit and depression of a push button 42 to maintain motor 91 energized until just prior to completion of a resulting cycle of operations of the transmitter.

As seen in the schematic wiring diagram of the circuit for the remote control unit 31 and its signal transmitter 32 in FIG. 2, this circuit includes a power line 138, preferably supplying alternating current of 24 volts, a signal line 139 and a common ground line 141. These three lines 138, 139 and 141 are connected to similar lines in the receiver or signal interpreting unit 34 (FIG. 3) in well-known manner by the simple three wire conductor 35 shown in FIG. 1. Again referring to FIG. 2, it will be seen that the supply line 138 is connected at the right side of that figure through a suitable rectifier in parallel with the several coin switches 48 of the accumulator 47. The other sides of these normally open coin switches 48 are connected, respectively, to one side of their associated accumulator coils 49, the other sides of which are connected to the ground wire 141. One side of the motor 91 is connected to the supply line 138, while its other side is connected by a conductor 142 to one side of the first accumulator switch 56 and one side of the full cycle switch 113. The other side of normally open switch 113 is connected to the common ground 141. The other side of normally open switch 56 is connected by a conductor 143 to the two motor contacts 98. A conductor 144 is connected to the first side of accumulator switch 56 and conductor 142 and extends through the two key banks for cooperation with the outer or forward push button switches 43, in a manner to be later described.

Interconnected between the supply line 138 and the common ground 141, as seen at the left in FIG. 2, is a suitable transformer 145, the secondary of which is connected to one side of the make selection light 46 and a plurality of program lights 146. The other sides of these program lights 146 are grounded to the common line 141, and they are suitably located in the casing of control unit 31 to illuminate the coin slot and the program holder. A conductor 147 connects the other side of make selection light 46 through the several normally closed push button switches 43 to one side of the normally open second accumulator switch 57. The other side of this switch 57 is connected to the common ground 141. In the lower central portion of FIG. 2 it will be seen that the signal line 139 is connected to one side of the first page signal switch 83, the other side of this switch being connected both to one side of the second page signal switch 84 and, by a conductor 148, to the second pulse train contact 101 second-from-the-left in the group of six such contacts 101 illustrated. The next-to-the-right or third such contact 101 is connected by a conductor 149 to the other side of the second page switch 84. The contact wiper arm 97 is connected by a line 151 to the common ground 141. The inner or rearward push button switch 44 operable by the number one key or push button 42 is shown as connected from point A to the signal line 139, and the latter also is connected at A to the last three contacts 99 of the first pulse train, being the contacts numbered 20, 21 and 22. In similar manner, conductors 152 respectively connect the other push button switches 44 with those contacts 99 identified by the capital letters corresponding to those identifying the push button switches 44. A conductor 153 connects the normally closed push button switches 44 of the two key banks in series.

The operation of the selectively operable control mechanism so far described is as follows. Assuming that all selections previously made have been effected, the various parts stop and are in their normally inoperative positions, in which all of the push buttons or selection keys 42 may be depressed or moved rearwardly, but such operation will have no effect whatever. The only time that depression of a push button 42 will be effective is at the end of any cycle of operations, or prior to the start thereof, while one or more units of value are registered in the accumulator 47 by virtue of prior deposit of a proper coin or coins in the coin slot. As previously described, deposit of any proper coin or coins in the coin slot results in such coin closing one or the other of the switches 48 and, as will best be appreciated from the wiring diagram of FIG. 2, that will cause actuation of the associated accumulator coil 49 which permits the normally open switches 56, 57 to close.

Two things result from such deposit of one or more coins in the control unit. One of these occurrences is the closing of the second accumulator switch 57, which completes a circuit through the make selection light 46. This circuit extends from the transformer 145 through conductor 147 and the several normally closed push button switches 43 and switch 57 to the common ground line 141. The operator is thus apprized that the control unit has been rendered operative and that any subsequent depression of a selected push button 42 will be effective to cause actuation of the corresponding controlled element in the record player 33 or other mechanism controlled by the unit 31. The second of these occurrences comprises the simultaneous closing of the first accumulator switch 56. Closing of the first accumulator switch 56 completes a circuit through motor 91 from the supply line 138 through conductor 142, switch 56, lead 143, contacts 98, wiper arm 97 and lead 151 to the common or ground wire 141. Motor 91 is thereby energized until wiper arm 97 is moved in a counterclockwise direction (viewing FIG. 2) out of contact with the upper of the two contacts 98. At that time, such circuit through motor 91 will be broken, and the operating mechanism will come to rest. This initial operation of motor 91 also actuates mechanism disclosed in the parent case to render latching slides active to latch any subsequently depressed push button 42 in its operative position. Following coin-responsive actuation of the accumulator 47 and the resulting turning on of make selection light 46, depression of any selected push button 42 will be accompanied by rearward movement of its associated switches 43, 44 from their normally full line positions of FIG. 2 to their broken line positions illustrated therein by push button #1. Switch 43 of selector button #1 thus actuated breaks the circuit through make selection light 46 to turn the latter off and closes a second starting circuit for motor 91. This latter motor starting circuit is traceable in FIG. 2 through conductor 142, conductor 144, the actuated switch 43, conductor 147 (and the normally closed switches 43 of the other key bank) and the second accumulator switch 57. A complete cycle of operations is thereby initiated to rotate wiper arm 97 in counterclockwise direction, viewing FIG. 2, to return the same to its normal rest position. Cam mechanism not illustrated herein maintains full cycle switch 113 closed to keep motor 91 energized until just prior to completion of such cycle of operations, when it causes opening of switch 113. That cam mechanism also causes further movement of the push button latching slides immediately following depression of any push button 42 to prevent depression of any other key 42 and to lock the one depressed in active position. As the cycle of operations is completed the cam mechanism returns the latching slides to inoperative position to release the depressed push button. Also, during the cycle of operations, a single unit of value is subtracted from the accumulator 47. If this results in zeroizing of the accumulator, wiper arm 97 will come to rest in its position of FIG. 2 and switches 56 and 57 will be opened. If, however, that cycle of operations does not result in zeroizing of the accumulator 47, and any additional unit or units of value remain therein, the accumulator switches 56, 57 remain closed. As a result, the first motor-initiating circuit through conductor 142, switch 56 and conductor 143 will be energized as the wiper arm 97 returns to its normal position of FIG. 2 to continue operation of the motor 91 until wiper arm 97 is moved out of engagement with the second contact 98. The previously effective push button 42 having been returned to normal position, make selection light 46 is again energized to indicate to the operator that unit 31 is in condition for a subsequent selection to be made. Thus each selective actuation of a push button 42 will effect a complete cycle of operations of the control unit, and the number of selective cycles that may be initiated will depend upon the number of units of value registered by the accumulator in response to deposit of proper coins.

During each cycle of operations, the wiper arm 97 in its counterclockwise rotation, viewing FIG. 2, successively engages each of the first pulse train contacts 99 and then each of the second pulse train contacts 101. If the #20 selector button 42 is that which has been actuated, all of the contacts 99 are effective to ground the wiper arm 97 as the latter successively engages them, so that the signal line 139 will transmit a resulting first train signal comprising twenty-two spaced pulses. This is accomplished by wiper arm 97 because there are twenty-two contacts 99, all of which are active when the #20 selector button 42 is locked in depressed position to ground arm 97 through their respective leads 152, the remaining closed push button switches 44 and conductor 153, and the connection from point A of the switch 44 associated with the #1 push button 42 to the signal line 139. In the event of any other smaller numbered push button 42 being that which is locked in depressed position, it will be seen that its resultingly opened switch 44 will break this last-described circuit to render inactive all of the contacts 99 associated with the higher numbered push buttons 42. Thus, for example, if the #1 push button 42 is that which is locked in depressed position, all except the last three contacts 99, which are identified as #20, #21 and #22, will be rendered inactive by the resulting opening of the switch 44 associated with that #1 push button 42, as illustrated in broken lines in FIG. 2. As a result, only three spaced signal pulses will flow through signal line 139, which will occur as wiper arm 97 successively engages those contacts 99 numbered 20, 21 and 22. In other words, the first signal train resulting from effective depression of any selector button 42 will consist of a series of spaced pulses through signal line 139 of a number comprising two more than the number identifying the depressed push button. It will also be seen from the above that simultaneous depression of two or more push buttons 42, either in the same or both key banks, will result in only that signal being given which corresponds, or is that normally given in response to the depression of, the lowest numbered depressed push button 42, since the switch 44 associated with the latter will render ineffective all of the contacts 99 associated with the higher numbered push buttons 42. It will further be seen from the above that release of the push buttons 42 may be accomplished at any time during the cycle of operations after wiper arm 97 has passed the #22 contact 99. Thereafter in each cycle of operations, the switches 43, 44 perform no function, other than that of the switches 43 in closing causing re-energization of the make selection light 46, providing accumulator 47 still contains some positive values so that its switch 57 remains closed.

As will be noted in FIG. 2, the spacing between the last or #22 contact 99 of the first pulse-train-controlling series of contacts and the first contact 101 of the series of contacts controlling the second pulse train signal is greater than that separating the several contacts 99 from each other. The significance of this spacing arrangement of the contacts engaged by wiper arm 97 will more clearly apparent from the following description. Depending upon which group of selections has been rendered active, or which group of indices has been selected by the operator, or rendered visible, by the actuation of the movable page members, the two page signal switches 83 and 84 will either both be open or closed, or switch 83 will be closed and switch 84 open. The character of the first signal train in each instance depends solely upon which of the selector buttons 42 has been rendered effective, so that the signal given in the first train will be the same in response to depression of any particular one of the push buttons 43, regardless of which group of identifying indices is exposed to view and the condition of switches 83 and 84. These switches 83, 84 determine the character of the signal given in the second pulse train automatically in response to the particular positions of the page members. With group I selected and both switches 83 and 84 open, there will be no signal pulses transmitted following those of the first train. With group II of the identifying indices 41 selected and page switch 83 closed, the second signal train will comprise one pulse which is effected in response to grounding of wiper arm 97 from signal line 139, through switch 83, conductor 148 and the second contact 101, as wiper arm 97 engages the latter. With group III selected, both switches 83 and 84 being closed, the second signal train will comprise two spaced pulses, the first as just described, and the second resulting from grounding of wiper arm 97 as it engages the third contact 101, thus completing the circuit from signal line 139 through switches 83 and 84, lead 149, wiper arm 97 and conductor 151 to the common ground line 141. Generally speaking, it is necessary to maintain a constant interval between the first and second signal trains in order to satisfactorily evaluate or decipher the resulting signals at the receiver 34. As will be appreciated from the above, this has been accomplished by the described arrangement of rotating the wiper arm 97 in a counterclockwise direction and connecting the contacts 99 to the push button switches 44 in reverse sequence relative to the numbering of the selector buttons 42 and the electrical interconnection between their respective switches. In practice, the spacing between the last engaged contact 99 and the first active contact 101 has been so arranged relative to the speed of rotation of wiper arm 97 that the interval between the last pulse of the first signal train and the first pulse of the second signal train, if any, will always be the same, and in the preferred embodiment in the nature of one-fifth of a second. At the same time, the interval between pulses in the first signal train is in the nature of one twenty-fifth of a second, being determined by the spacing between each of the adjacent contacts 99 in relation to the speed of rotation of wiper arm 97. This same interval or "off time" may be maintained between the pulses of the second signal train, as determined by the spacing between adjacent contacts 101.

Figure 3:
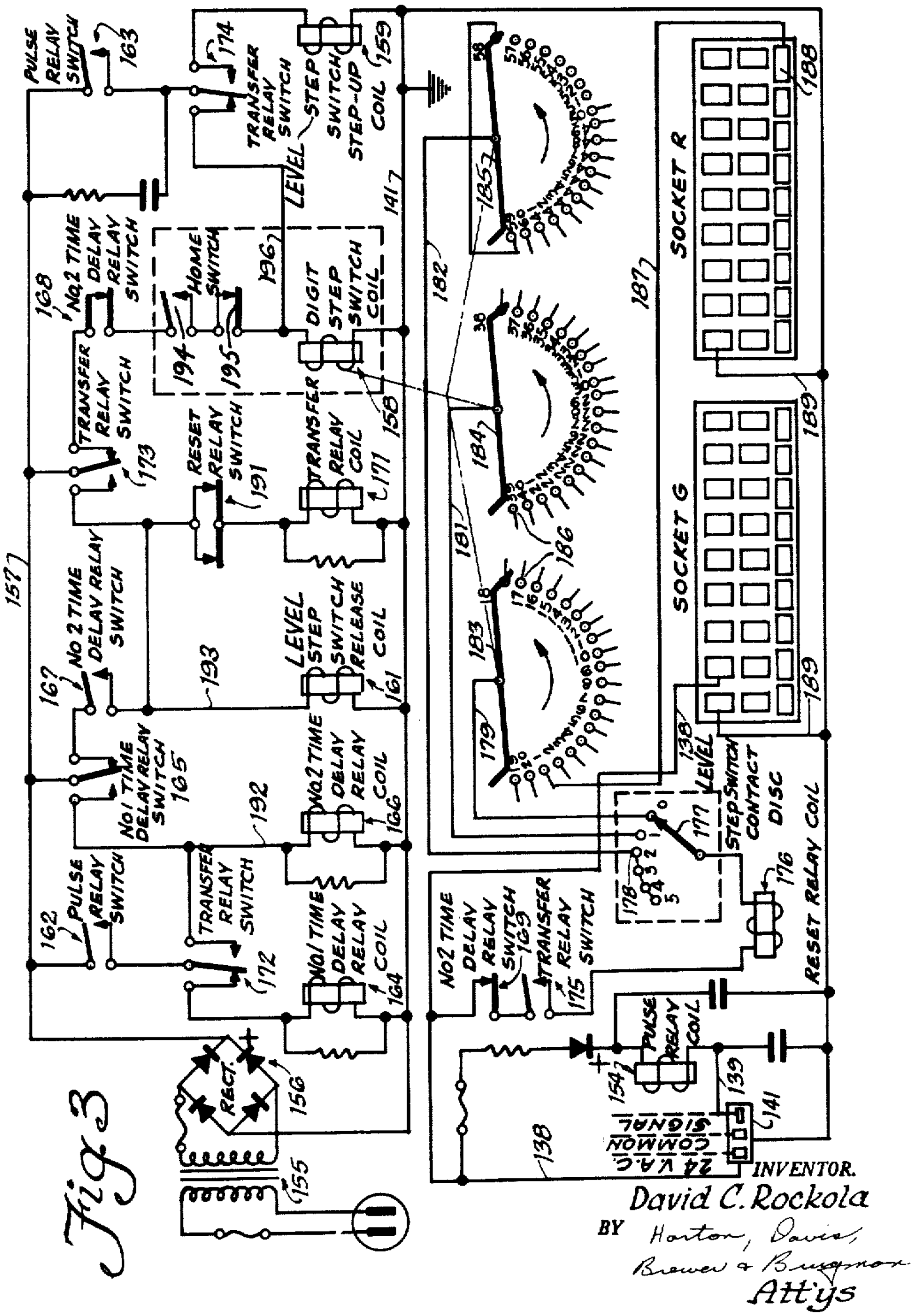
FIG. 3 is a wiring diagram of my novel receiver unit for receiving and interpreting such multi-train signals.

Referring now to FIG. 3, the receiver or signal interpreting unit 34, which comprises the present invention and for which this figure gives the wiring diagram, is designed to count the pulses in two signal trains carried by the signal line 139, to differentiate between the two trains of pulses, to select the proper specific electrical element to be energized to thereby effect the desired selected operation of the phonograph 33, or other controlled mechanism, and to reset itself after thus accomplishing each selection or cycle of operations. As previously noted, the three lines 138, 139 and 141 of FIG. 2 are connected to the receiver circuit of FIG. 3 (lower left-hand corner) by conductor 35. The coil 154 of a pulse relay comprising part of a pulse-responsive means is connected from supply line 138 to signal line 139, in series with a suitable fuse, resistor and rectifier, so as to be operable in response to each signal pulse effected, as previously explained, by the grounding of wiper arm 97 of the control unit 31. Suitable condensers also are connected between opposite sides of coil 154 and the ground line 141, as shown at the lower left corner of FIG. 3. Referring now to the upper portion of this wiring diagram, a transformer 155 is shown connected to a standard power supply, and a full wave selenium bridge rectifier 156 is connected to the outlet side of the transformer, the ground line 141 and a supply line 157 which thereby provides direct current of 24 volts for operating two time delay relays, a digit step coil 158, a transfer relay coil 171, a level step switch step-up coil 159, and a level step switch release coil 161.

The pulse relay, in addition to coil 154 previously described, comprises two switches 162 and 163 which are actuated thereby. The No. 1 time delay relay comprises a coil 164 and a double throw switch 165 actuated thereby, while the No. 2 time delay relay comprises a coil 166 for controlling actuation of one normally open switch 167 and two normally closed switches 168 and 169. The transfer relay comprises a coil 171 and three double throw switches 172, 173 and 174 and a normally open switch 175 controlled thereby. This latter transfer relay switch 175 is connected in series with the No. 2 time delay relay switch 169, from the alternate current supply line 133 (lower left corner of FIG. 3), and a reset relay coil 176 and the arm of a level step switch 177. The latter normally engages the #0 contact 178 of a level step switch contact disc containing several numbered contacts 178, is movable step-by-step counterclockwise by energizations of its coil 159, and is returned clockwise to its zero position of FIG. 3 in response to energization of its release coil 161. The #0 contact 178, the #1 contact 178, and the #2, etc., contacts 178 are connected, respectively, to lines 179, 181 and 182, which are connected in turn, respectively, to wiper arms 183, 184 and 185 of a multiple-armed rotary step-switch which are movable counterclockwise by energizations of coil 158 to successively engage contacts 186 of that switch. These contacts 186 are numbered in like manner to the identifying indices previously referred to and are connected, respectively, by conductors 187 to separate contacts 188 of sockets G and R. One of these contacts 188 of each socket is connected to the common ground line 141 by a conductor 189, and another contact 188 is connected to the supply line 138. Thus, suitable plugs and conductors engaging sockets G and R will interconnect the contacts 186 with the usual selector coils of the phonograph 33, or other individual electrically operable members of the apparatus to be controlled by selector unit 31. The wiper arms 183, 184 and 185 are returned in a clockwise direction to their normal or home position of FIG. 3 in response to energization of reset relay coil 176 in well-known manner. The reset relay also includes a normally closed switch 191 which is held open during energization of its coil 176.

Referring again to the upper portion of FIG. 3, the pulse relay switch 162 is connected in series with the normally closed contact of transfer relay switch 172 and coil 164 from the direct current supply line 157 to the common ground line 141. Coil 164 of the No. 1 time delay relay, as well as coils 166 of the No. 2 time delay relay and 171 of the transfer relay are respectively provided with suitable shunt resistances. The normally open contacts of transfer relay switch 172 and No. 1 time delay relay switch 165 are interconnected by a conductor 192 which also is connected to one side of the No. 2 time delay relay coil 166, the other side of which is connected to the common ground 141. The normally closed contact of switch 165 is connected in series from supply line 157 to one side of the normally open switch 167. The other side of switch 167 is connected by a conductor 193 to one side of the level step switch release coil 161, the other side of which is grounded as shown. Conductor 193 is also connected to the normally open side of transfer relay switch 173 and one side of reset relay switch 191. The latter is connected to one side of transfer relay coil 171, the other side of which is connected to the common ground 141. The arm of transfer relay switch 173 is connected to the supply line 147 and its normally closed contact is connected to No. 2 time delay relay switch 168. The latter is connected in series with a normally open home switch 194, a self impulse switch 195 and the digit step switch coil 158 to the common ground line 141. The latter coil 158 is also connected by a conductor 196 to the normally closed contact of transfer relay switch 174. The arm of switch 174 is connected in series with the pulse relay switch 163, the latter being connected in parallel, as shown in the upper right corner of FIG. 3, with a suitable resistance and condenser. The normally open contact of transfer relay switch 174 is connected in series with level step switch step-up coil 159 to the common ground line 141.

The operation of the receiver or signal interpreting means 34 of FIG. 3 is as follows. At the end of each cycle of operations of the transmitter 32, the several parts of the receiver 34 will assume their normal positions illustrated in FIG. 3. When the first pulse of the first signal train is effected, as previously described, pulse relay coil 154 is thereby energized to momentarily close pulse relay switches 162 and 163. Closing of switch 162 energizes No. 1 time delay relay coil 164 to actuate No. 1 time delay relay switch 165 to close its normally open contact. This energizes No. 2 time delay relay coil 166 which closes switch 167 and opens normally closed switches 168 and 169. The two time delay relays thus are actuated in response to the first signal pulse, and the No. 1 time delay relay is so designed that it will maintain itself in such actuated condition during the time interval (in the nature of $\frac{1}{25}$ of a second) between successive pulses of the first signal train. In response to each pulse of the first signal train, switch 163 is closed momentarily to energize the digit step switch coil 158. Each such actuation of coil 158 moves the wiper arms 183, 184 and 185 one step in a counterclockwise direction. Thus, if the #1 selector button 42 was that depressed to institute these signals, the wiper arms 183, 184 and 185 would thereby be disposed in engagement, respectively, with the #1, #21 and #41 selector coil contacts 186, the resulting first signal train then comprising three pulses.

Following the above-described operation of the receiver in response to the first signal train, the previously described spacing between the #22 contact 99 (FIG. 2) and the first effective contact 101, if any of the latter are effective by virtue of one or both of the page switches 83, 84 being closed, results in a longer interval which causes de-energization of the No. 1 time delay relay coil 164. As noted, this interval between the first and second signal trains is in the nature of $\frac{1}{5}$ of a second, which is sufficient to result in the No. 1 time delay relay letting go. This includes the return of switch 165 to its condition of FIG. 3. At this instant, the No. 2 time delay relay coil 166 is still holding because of its energization through switch 165 until the instant the latter is so returned to its position of FIG. 3, so that the No. 2 time delay relay switch 167 is still closed which causes the transfer relay coil 171 to be energized. The immediate result of energization of coil 171 is the actuation of its associated switches 172, 173, 174 and 175. This movement of switch 173 from its position of FIG. 3 maintains the transfer relay coil 171 energized to lock in the transfer relay. The design of these several parts is such, however, that the release of the No. 2 time delay relay in response to release of the No. 1 time delay relay results in opening of the No. 2 time delay relay switch 169 prior to the above-described closing of transfer relay switch 175, so that the reset relay coil 176 is not thereby energized. This operation of the transfer relay coil 171 automatically conditions the receiver for actuation in response to the following second signal train, if there be any signal pulses therein as a result of page switches 83 and/or 84 being closed. Again, the electrical design of the component parts is such that each signal pulse of the second train, through switches 162 and 172, will temporarily re-energize the No. 2 relay coil 166 sufficiently to maintain the same active until completion of the second signal train. In the meantime, each pulse of the second signal train, through the resulting instantaneous closing of pulse relay switch 163, will energize the level step switch step-up coil 159, through switch 174, to move the wiper arm 177 in a counterclockwise direction into engagement with the next higher numbered contact 178 of the level step switch. It will be appreciated, of course, that the previous return of No. 1 time delay relay switch 165 to its position of FIG. 3 while No. 2 time delay relay switch 167 was closed and the immediately following actuation of transfer relay switch 173 has energized the level step switch release coil 161. So long as this coil 161 is energized, arms 177, 183, 184 and 185 will remain in any position to which they are moved in response to energizations of coils 158 and 159. The wiper arm 177, of course, will remain in its home position of FIG. 3 if there is no second signal train pulse, it will be moved into engagement with the #1 contact 178 if only one pulse is contained in the second signal train, and if the second signal train comprises two spaced pulses, level step switch arm 177 will be moved into engagement with the #2 contact 178. Regardless of the specific character of the second signal train, the No. 2 time delay relay releases prior to completion of the cycle of operations of the control unit 31. The resulting return of the No. 2 time delay relay switch 169 to its normal closed position, transfer relay switch 175 still being locked closed, will complete an operating circuit from supply line 138 through the level step switch arm 177 and one or the other of the three conductors 179, 181 or 182, and the proper conductor 187, to produce a single signal current surge to effect the desired selected machine operation, such as energization of a selector coil of the automatic phonograph 33 corresponding to the selected indentifying index. At the same time, reset relay coil 176 is energized to open switch 191. This breaks the circuit to transfer relay coil 171.

As previously noted, energization of level step switch release coil 161 enables arms 177, 183, 184 and 185 to be latched in any position to which they are moved. After the above described opening of reset relay switch 191, transfer relay coil 171 holds its switches 172, 173, 174 and 175 momentarily, before releasing to cause their return to the positions of FIG. 3, so that for such moment or short interval, reset relay switch 191 is held open (through switch 175 maintaining the circuit through coil 176), and switch 173 insures continued energization of level step switch release coil 161. As soon as the holding interval of transfer relay coil 171 terminates, its several switches return to their home positions of FIG. 3. This results in de-energization of level step switch release coil 161 to cause return of arms 177, 183, 184 and 185 to their home positions of FIG. 3. It also de-energizes reset relay coil 176 which causes closing of reset relay switch 191. All of the parts are thus returned to their normal positions of FIG. 3 to complete the cycle of operations of the receiver or signal interpreting means during which the proper electrically operable member within the unit being controlled is actuated in response to the previous actuation of the page members to select the desired group of identifying indices and the actuation of the particular push button 42 associated with the selected identifying index within the selected group.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the class described, receiving means for receiving and interpreting a multi-train signal to effect operation of a particular one of a plurality of electrically controllable devices, comprising a first switch means having a plurality of blades and an equal plurality of groups of contacts, each one of said groups of contacts being engageable by only one of said blades and each one of said blades engaging only one of said groups of contacts, means for electrically interconnecting each of said contacts with one of said devices, level step switch means for selectively electrically connecting with a given one of said blades for rendering the latter effective, pulse-responsive means for effecting positioning of said blades in response to a first train of said multi-train signal and actuation of said level step switch means in response to a second train of said multi-train signal, and reset means operable in time-spaced relationship to said second signal train to reset said receiving means to normal condition, said pulse-responsive means comprising a pulse-responsive relay, time delay relay means controlled thereby, and transfer relay means controlled by said time delay relay means and including transfer switch means normally operable to effect actuation of the blades of said first switch means in response to energization of said pulse-responsive relay and, under control of said time delay relay means, operable to effect actuation of said level step switch means.

2. In a device of the class described, receiving means for receiving and interpreting a multi-train signal to effect operation of a particular one of a plurality of electrically controllable devices by means of a single signal current surge, comprising a first switch means having a plurality of blades and an equal plurality of groups of contacts, each one of said groups of contacts being engageable by only one of said blades and each one of said blades engaging only one of said groups of contacts, means for electrically inter-connecting each of said contacts with one of said devices, level step switch means for selectively electrically connecting with a given one of said blades for rendering the latter effective, pulse-responsive means for effecting positioning of said blades in response to a first train of said multi-train signal and actuation of said level step switch means in response to a second train of said multi-train signal, and time delay relay means energized in response to said multi-train signal and automatically released upon completion of the latter to cause said signal current surge.

3. In a device according to claim 2, electrically operable reset means energized by said signal current surge to cause return of said receiving means to normal condition.

4. In a device of the class described, receiving means for receiving and interpreting a multi-train signal to effect operation of a particular one of a plurality of electrically controllable devices by means of a signal current surge, comprising an electrical supply line, a first switch means having a plurality of blades and an equal plurality of groups of contacts, each one of said groups of contacts being engageable by only one of said blades and each one of said blades engaging only one of said groups of contacts, means for electrically interconnecting each of said contacts with one of said devices, level step switch means including a wiper arm for selectively electrically connecting with a given one of said blades for rendering the latter effective, pulse-responsive means for effecting positioning of said blades in response to a first train of said multi-train signal in response to a first train of said multi-train signal and actuation of said level step switch means in response to a second train of said multi-train signal, and time delay relay means energized in response to said multi-train signal and automatically released thereafter to cause said signal current surge from said supply line serially through said wiper arm and the effective one of said blades to the proper one of said devices.

References Cited in the file of this patent

UNITED STATES PATENTS

| | | |
|---|---|---|
| 1,986,972 | Hershey | Jan. 8, 1935 |
| 2,557,581 | Triman | June 19, 1951 |
| 2,624,795 | Bodoh | Jan. 6, 1953 |

UNITED STATES PATENT OFFICE

CERTIFICATE OF CORRECTION

Patent No. 3,085,228 April 9, 1963

David C. Rockola

It is hereby certified that error appears in the above numbered patent requiring correction and that the said Letters Patent should read as corrected below.

Column 1, line 38, for "on" read -- an --; column 6, line 55, after "will" insert -- be --; column 12, lines 16 and 17, strike out "in response to a first train of said multi-train signal".

Signed and sealed this 5th day of November 1963.

(SEAL)
Attest:

ERNEST W. SWIDER
Attesting Officer

EDWIN L. REYNOLDS
Acting Commissioner of Patents